United States Patent [19]

Igenbergs et al.

[11] Patent Number: 4,817,426
[45] Date of Patent: Apr. 4, 1989

[54] METHOD AND AN APPARATUS OF DETERMINING THE ANGLE OF AN INCIDENT FLOW AND/OR OF THE AIRSPEED AT A STATIONARY OR MOVING POINT OF MEASUREMENT

[75] Inventors: Eduard Igenbergs; Christian Jahncke, both of Munich, Fed. Rep. of Germany

[73] Assignee: Prof. Dr.-Ing. Eduard Igenbergs, Munich, Fed. Rep. of Germany

[21] Appl. No.: 941,240

[22] Filed: Dec. 12, 1986

[30] Foreign Application Priority Data

Dec. 13, 1985 [DE] Fed. Rep. of Germany ....... 3544144

[51] Int. Cl.$^4$ .......................... G01C 21/00; G01P 5/14
[52] U.S. Cl. .......................................... 73/180; 73/182
[58] Field of Search ...................... 73/180, 182, 178 R, 73/178 T, 178 H, 861.42, 861.43, 861.44

[56] References Cited

U.S. PATENT DOCUMENTS

| | | | |
|---|---|---|---|
| 2,515,251 | 7/1950 | Morris | 73/180 |
| 3,094,868 | 6/1963 | Andersen, Jr. et al. | 73/180 |
| 3,880,002 | 4/1975 | Gallington | 73/180 |

FOREIGN PATENT DOCUMENTS 0200831 8/1967 U.S.S.R. ................................ 73/180

OTHER PUBLICATIONS

Wright, "The Evaluation of ... Calibration Data" J. of Physics E. 1970, vol. 3, pp. 356–362.

Primary Examiner—Donald O. Woodiel
Attorney, Agent, or Firm—Townsend & Townsend

[57] ABSTRACT

In a method of determining the angle of an incident flow at a stationary or moving point of measurement, especially at a point of measurement on a vehicle, the pressure of the incident flow on the surface of a sphere or of a spherical segment is measured. The resulting pressure distribution on the surface is compared with a pressure distribution associated with a defined angle of incident flow and from this the angle of incident flow is calculated, or the angle of displacement of the pressure distribution curve that is found is determined relative to a desired predetermined coordinate system, or relative to a predetermined pressure distribution curve associated with a defined incident flow angle. The determination of the incident flow angle is particularly accurate and can be achieved with minimal measurement complexity in a reliable manner.

30 Claims, 6 Drawing Sheets

METHOD AND AN APPARATUS OF DETERMINING THE ANGLE OF AN INCIDENT FLOW AND/OR OF THE AIRSPEED AT A STATIONARY OR MOVING POINT OF MEASUREMENT

The invention relates to a method and to an apparatus for determining the angle of an incident flow and/or the airspeed at a stationary or moving point of measurement, especially at a point of measurement on a vehicle, in particular the sideslip angle of an aircraft.

An apparatus for determining the sideslip angle of an aircraft is for example known from U.S. patent application Ser. No. 2,538,003. This apparatus consists of a tube having a tip in which two bores are present. The bores are arranged inclined to the longitudinal axis of the tube and are connected via a passage system to two sides of a selection valve. Each of these sides has a respective connection to the pilot's helmet and respective openings are provided in the pilot's helmet at the level of the pilot's cheeks so that the air flowing into the left hand bore of the semi-spherical tip acts on the pilots left cheek and the air flowing into the right hand bore acts on the pilot's right cheek.

A further input of the selection valve is acted on by the ram pressure picked up at the outside on the aircraft. This input is normally closed by a valve body. If the air pressure entering via one of the bores in the tip exceeds a value predetermined by springs arranged in the selection valve, then the valve body is displaced, and thereby gives rise to a corresponding communication between the ram pressure input of the selection valve and the corresponding connection to the pilot, so that a substantially more intensive air pressure present at the ram pressure input acts on the corresponding cheek of the pilot.

This very simple apparatus for determining the angle of the incident flow is only suitable for a coarse qualitative determination of the angle of attack. A precise measurement of the angle of attack is not possible with this apparatus. A precise measurement of the angle of attack of this kind is however currently required in order to minimize the running resistance of a vehicle, for example the air resistance of an aircraft, and to avoid the formation of air turbulence. For this purpose the aerodynamically favourably shaped vehicle must be held in an ideal position with regard to the fluid flowing around it.

It is consequently the object underlying the present invention to provide a method for determining the angle of attack at stationary and moving points of measurement, especially at a point of measurement on a vehicle, in accordance with the precharacterizing part of claim 1, which ensures, with minimized flow resistance, both maximum measurement accuracy with minimum constructional complexity and a high degree of reliability, and which also makes it possible to directly influence the control or steering of the vehicle.

This object is satisfied by a method of the initially named kind in which pressure values for the incident flow are measured at the measurement body which has the form of a sphere or of a spherical segment at at least two locations on each of side of a line of symmetry of the sphere; in which the pressure distribution curve over the surface of the sphere or spherical segment associated with the prevailing angle of incidence is determined from these pressure values; and in which the angle of incidence is determined by finding the angle of displacement of the determined pressure distribution curve relative to any desired coordinate system, or relative to a pressure distribution curve measured previously using the same method, or relative to a pressure distribution curve associated with a defined angle of incidence; while for determination of the airspeed the maximum pressure value of the incident flow is determined in the form of the sum of the static pressure and of the dynamic pressure, a value corresponding to the static pressure and available as a reference value is subtracted from said maximum value, and the airspeed is calculated from the result.

Through the method of the invention there is provided for the first time the possibility of measuring the angle of attack at a stationary or moving point of measurement, especially a vehicle, and in particular on an aircraft, with a measurement accuracy of approximately $\pm 0,1°$. This high accuracy is achieved by measuring the pressure of the incident flow on the surface of a sphere or of a spherical segment because the flow around a sphere is the same from any direction. Consequently the angle of attack to be determined can be found, in accordance with the invention, in a particularly simple manner by comparing a measured pressure distribution, which represents a particular angle of incidence, with a known pressure distribution which represents a known angle of incidence, for example an angle of incidence parallel to the longitudinal axis of the vehicle. This comparison can take place mechanically by rotating the sphere or spherical segment until the measured distribution corresponds to the known pressure distribution, or, when the sphere is fixedly mounted on the vehicle, by calculating the line of symmetry of the pressure distribution and comparing the position of this line of symmetry either with the line of symmetry of another previously measured or predetermined line of symmetry or with a corresponding pressure distribution, preferably in spherical coordinates.

The measurement at at least two locations on each of two sides of a line of symmetry of the measuring body makes it possible to carry out a precise statistical evaluation of the individual pressure measurements and thus to increase the overall measurement accuracy of the method. If the pressure measuring devices are arranged symmetrically about the line of symmetry, so that the inherent errors of individual pressure measuring devices at symmetrical positions, are essentially identical, then the measurement result will not be falsified by these inherent errors.

The direction of the flow incident on the sphere can also be found without presetting a pressure distribution curve associated with a defined angle of incidence. For this purpose at the least two identical mathematical approximations around a desired radius vector starting from the centre of the sphere are respectively adapted to half, or to the corresponding fraction of the total number of the measurement values, however to at least two of the measurement values. Having regard to the fact that the said approximations must have the same value at the line of symmetry of the pressure distribution, and that the maximum of the pressure distribution and of the approximations is to be found at this position, it is possible to determine the position of the radius vector which determines the line of symmetry with reference to a coordinate system which has previously been freely selected. A Taylor series can advantageously be used for the mathematical approximation.

It is of particular advantage that the apparatus which can be used to determine the angle of an incident flow can be used in the same manner and without additional complexity also for the measurement of airspeed. For this purpose the maximum pressure value of the incident flow is determined by calculation by making use of the pressure measuring devices. By subtracting the value of the static pressure from the maximum pressure equivalent to the sum of the static pressure and of the dynamic pressure the dynamic pressure can be identified and the speed calculated from the value so obtained. The static pressure thereby corresponds to the reference pressure which prevails in the closed chamber within the measuring body which communicates with the environmental atmosphere via a fluid connection.

Advantageous embodiments of the invention are set forth in the subordinate claims.

The invention will now be explained in the following with regard to an embodiment and with reference to the drawings; which show.

Figure 1:
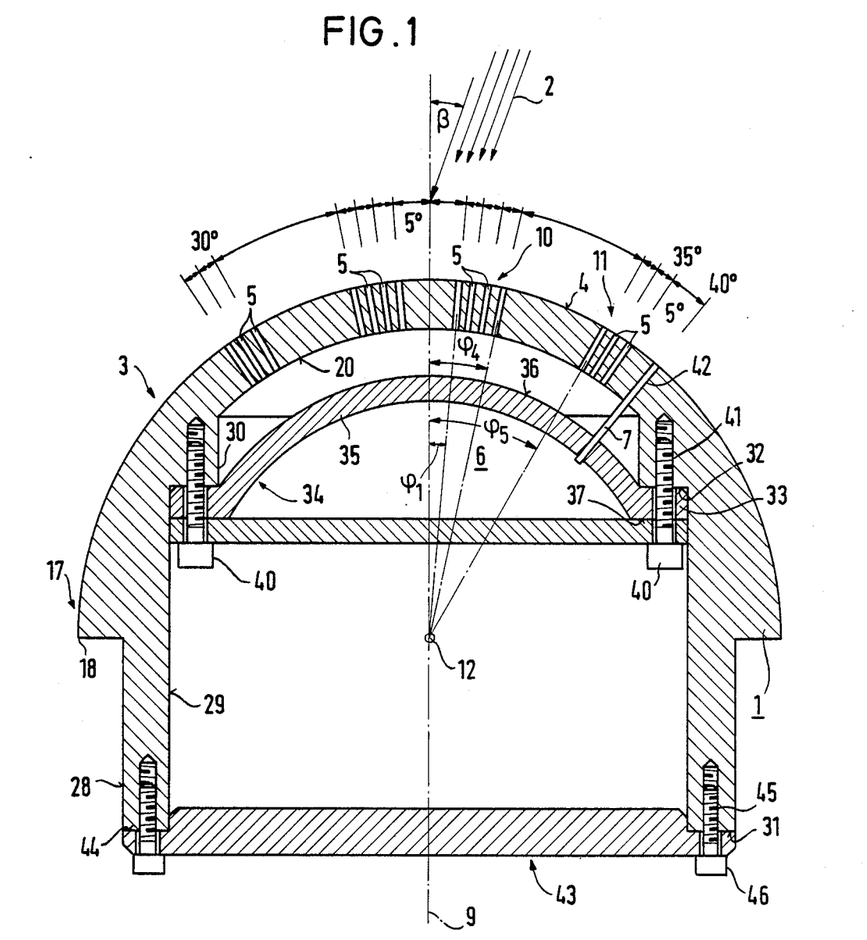
FIG. 1 a view of the apparatus of the invention in horizontal section.

As seen in FIG. 1 a fluid flow 2 incident on the surface 4 of a hemisphere or a spherical segment 3 generates on the surface 4 a pressure which is measured at different locations 5 on the surface 4. These pressure measurements result in a measured pressure distribution on the surface 4 which is characteristic for the prevailing angle of the incident flow, equal to the angle of attack.

The measured pressure distribution is subsequently compared with a known pressure distribution which is associated with a known angle of the incident flow, for example 0°. The angle of the incident flow ($\beta$) which is sought then follows from this comparison.

The apparatus of FIG. 1 for determining the angle of incidence consists of a measurement body 1 which has the shape of a hemisphere. The surface 4 of the hemisphere 3 is very smooth and of a high surface quality in order to provide a low flow resistance and to avoid turbulent breakaway at the surface.

In the cross-sectional plane shown in FIG. 1 two groups 10,11 of bores which pass through the surface 4 of the hemisphere 3 are formed in the measuring body 1 on each of the two sides of the line of symmetry 9 which forms the central axis of the measuring body 1. Pressure measuring devices 5 are inserted into these bores with the outer surfaces of the pressure measuring devices lying smoothly flush with the surface 4 of the hemisphere 3. The first group 10 of bores adjacent to the line of symmetry 9 consists of four bores of which the bore closest to the line of symmetry subtends an angle $\rho 1 = 5°$ relative to the centre of curvature 12 of the hemisphere. The distance between the bores amounts in each case to 2,5° so that the fourth bore of this group 10 lies at an angle $\rho 4 = 12,5°$ to the line of symmetry 9. The bore of the second group 11 disposed closest to the line of symmetry subtends an angle $\rho 5 = 30°$ to the line of symmetry 9 starting from the centre of curvature 12 and is again followed at respective intervals of 2,5° in each case by two bores, so that this group includes three bores.

The spacing between the bores of one group is dependent on the diameter of the pressure measuring devices 5 and can advantageously also be smaller than 2,5°.

The arrangement of the pressure measuring devices in groups makes it possible to adapt the measurement locations to the expected pressure distribution curve which is dependent on the course of the surface on which the pressure measuring devices are arranged.

The groups of pressure measuring devices are sensibly arranged in regions in which the expected pressure changes between the individual pick-ups over the course of the surface are very small. On the other hand the individual pick-ups are sufficiently spaced from one another that a reliable statistical evaluation is made possible however without the pressure measuring devices being influenced by eddy formation.

The measurement body 1 has a stepped bore 29 at its side facing away from the hemispherical surface 4. This stepped bore is coaxial to the central axis and terminates in blind manner at a curved internal wall 20. The curved wall 20 has the same centre of curvature 12 as the surface 4 and extends parallel thereto. A wall region of the hemisphere 3 of the measuring body 1 is formed between the surface 4 and the internal surface 20 and is penetrated by the bores for receiving the pressure measuring devices 5.

The region of the blind bore which includes the curved inner surface 20 is followed by a shorter cylindrical portion which in turn merges via a step into a cylindrical portion of a greater radius, which then extends up to the opening of the blind bore.

The measuring body 1 has a cylindrical outer surface coaxial to the central axis which extends from the end of the measurement body 1 in which the opening of the blind bore lies up to the level of an imaginary plane which passes through the centre of curvature 12 perpendicular to the central axis. A ring-like step then extends outwardly along this plane and intersects the surface 4. The line of intersection of the surface 4 of the hemisphere 3 with the ring-like step which extends perpendicular to the central axis forms a breakaway edge in order to improve the flow around the hemisphere 3. A wall region of the measuring body 1 is formed between the cylindrical outer surface 28 of the measuring body 1 and the larger diameter cylindrical portion 29 of the blind bore, and terminates at the open end of the blind bore at a ring-like end face 31. A further ring-like step 32 extending perpendicular to the central axis is formed between the cylindrical portions 29, 30 of the blind bore.

This ring-like step 32 is contacted by a ring-like flange 33 of a dome-like part 34 in such a way that the dome-like portion 35 of the dome-like part 34, which is formed by a wall of uniform thickness having the cross-sectional shape of a circular ring segment, has its convex outer side 36 disposed towards the inner surface 20. When the ring-like flange 33 contacts the ring-like step 32 then the centre of curvature of the dome-like portion 35, and of its convex outer side 36, is at substantially the same position as the centre of curvature 12 of the surface 4 of the hemisphere 3.

The ring-like flange 33 has a circular ring-like surface 37 at its end face facing away from the ring-like projection 32. The inner surface of an inner lid 29 sealingly contacts this circular ring-like surface 37. In this manner a closed chamber 6 is formed which is surrounded by the dome-like part 34 and the inner cover 39. The inner cover 39, the ring-like flange 33 and also the ring-like step 32 are each provided with a plurality of bores distributed around their respective peripheries. Respectively associated bores in the inner lid 39, in the ring-like flange 33 and in the ring-like step 32 are aligned with one another. Respective screens 40 pass through the aligned bores in the inner lid 39 and in the ring-like flange 33 and engage in threads 41 in the ring-like step 32. The closed chamber 6 has a fluid connection 7 which is formed by a tubule 42. This tube or tubule subtends an angle of 40° to the central axis 9 at the centre of curvature 12 and passes through the dome-like portion, the space formed between the inner surface 20 and the convex outer side 36 of the domelike portion, and the outer wall 21 of the hemisphere where it opens at the surface 4.

An outer cover 43 has a ring-like seat 44 in the region of its outer periphery which lies flat against the ring-like end face 31. The outer periphery of the outer cover is flush with the cylindrical outer surface 28 of the measurement body 1, i.e. aligned therewith.

Bores which extend parallel to the central longitudinal axis are provided in the region of the outer periphery of the outer cover 43 and are aligned with further threaded bores 45 in the ring-like end face 31 of the measurement body 1. Threaded fasteners 46 which pass through the bores in the outer cover 43 are threaded into the threaded bores 45 and fixedly secure the outer cover 43 to the measurement body 1.

Figure 2:
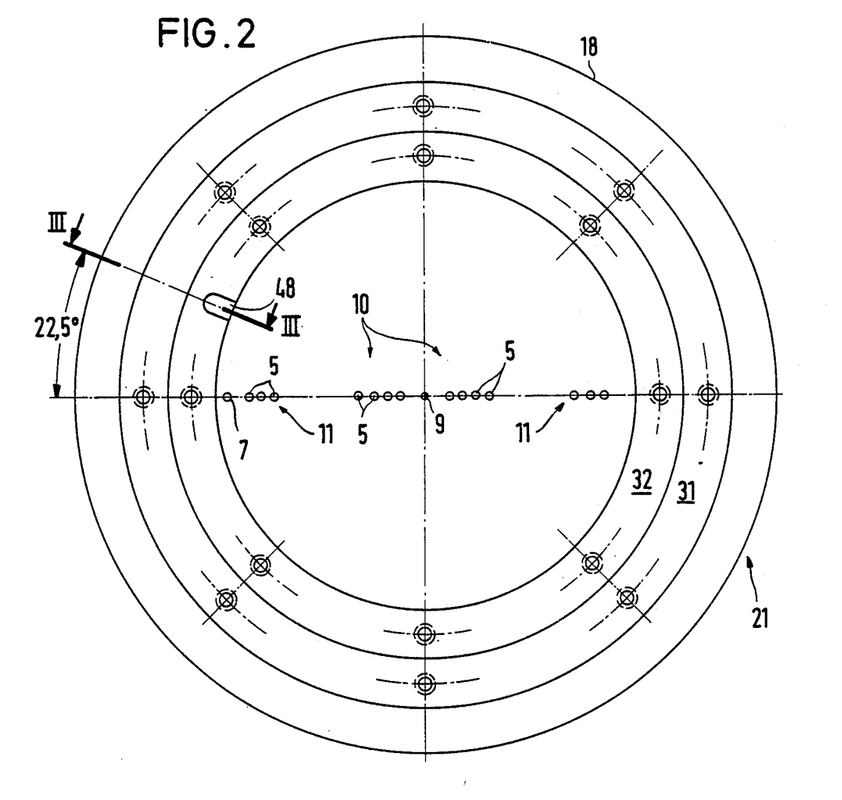
FIG. 2 a rear view of the outer housing portion of the apparatus of the invention opposite to the direction of the incident flow, FIG. 3 a sectioned side view of the apparatus of FIG. 2 along the line III—III, FIG. 4 the arrangement of a pressure pick-up in the apparatus of the invention, FIG. 5 the sequence of signal processing in an apparatus in accordance with the invention, FIG. 6 the arrangement of a protective device for an apparatus in accordance with the invention as viewed from the side, FIG. 7 the mounting of an apparatus in accordance with the invention on an aircraft, and FIG. 8 the detail VIII of FIG. 7.
Figure 3:
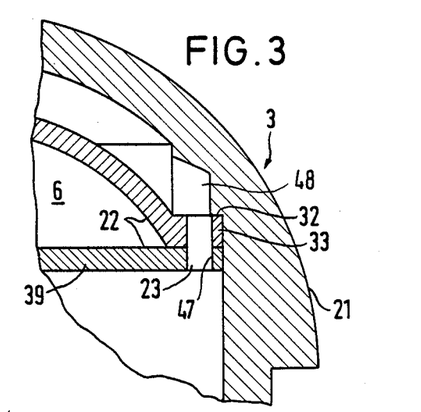

It can be seen from FIG. 2 that a cut-out 48 is provided in the ring-like step 32 at an angular position measured at the line of symmetry 9 of 22,5° relative to the plane in which the pressure measuring devices 5 are arranged. As can be seen in FIG. 3 this cut-out is aligned with an opening 47 which forms a passage 23 for connections 24 which passes through the ring-like flange 33 and the inner lid 39, which together form an inner housing portion 22.

Figure 4:
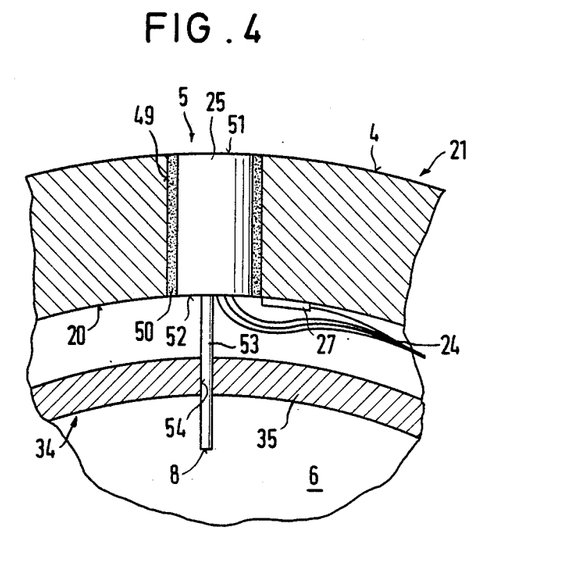

FIG. 4 shows the arrangement of a pressure measuring device 5 which consists of a piezoresistive pressure pick-up 25. This type of pick-up enables the best possible integration of the pressure pick-up into the surface 4 so that the structure of the surface is only insubstantially changed and simultaneously leads to a highly accurate pressure measurement. The piezoresistive pressure pick-up 25 is inserted into a bore 49 and is secured by a suitable composition 50 into the bore 49. The surface 51 of the pressure pick-up 25 adjacent the surface 4 of the hemisphere 3 lies smoothly flush with the surface 4 without the formation of a step.

At the end 52 of a pressure pick-up 25, adjacent the inner surface 20, the pressure pick-up has a tubule 53 which points away from the pressure pick-up 25 and sealingly passes through a bore 54 in the spherical portion 35 of the dome-like part 34 and forms the reference pressure pick-up section 8 of the pressure measuring device 5 in the closed chamber 6.

A device 27 for determining the temperature is provided on the inner surface 20 in the vicinity of the pressure pick-up 25 in order to measure the temperature of the pressure pick-up 25, or of the region of the outer housing portion 21 surrounding the pressure pick-up 25. Thus the temperature is determined in the region of the pressure measuring devices in order to increase the measurement accuracy and is then passed on to the evaluation device to compensate for temperature dependent measuring errors during pressure measurement.

Connections 24 extend from the pressure pick-up 25 and the temperature sensor 27 into the space between the inner surface 20 and the dome-like portion 35. These connections 24 are lead out of this region through the cut-out 48 and the passage 23, extend through the space formed by the cylindrical portion 29 the inner lid 39 and the outer lid 43 and leave this space through an opening (not shown) in the outer lid or cover 43. They are then led to the evaluation device.

Figure 6:
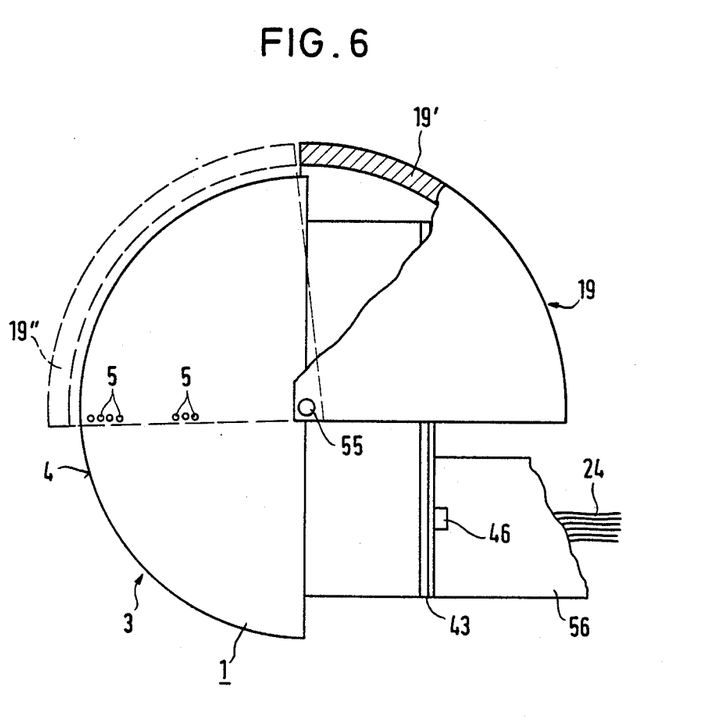

The arrangement of a protective device 19 for the surface 4 of the hemisphere 3 is shown in FIG. 6.

This protective device consists of a hollow spherical portion the inner radius of which is larger than the radius of curvature of the surface 4 of the hemisphere 3. This protective device is rotatably arranged about an axle 55 which lies in a plane extending through the pressure measuring devices 5 and the centre of curvature 12 and intersects the centre of curvature 12.

The protective device 19 can adopt a retracted position 19' which does not cover the surface 4 of the hemisphere 3 and can, in the event that external effects could bring about destruction of the pressure measuring devices, be moved into a deployed position 19" in which it covers at least the portion of the surface 4 of the hemisphere 3 in which the pressure measuring devices 5 are arranged. This movement can be effected by a drive apparatus which is not shown, for example by a servomotor, and indeed also during the operation of the vehicle.

A mounting means 56 for attaching the apparatus of the invention to a vehicle is provided in the portion of the outer cover 43 which is not covered by the protective device 19 in its retracted position 19'. The mounting means 56 also accommodates the connection lines 24, which can pass through it.

Figure 7:
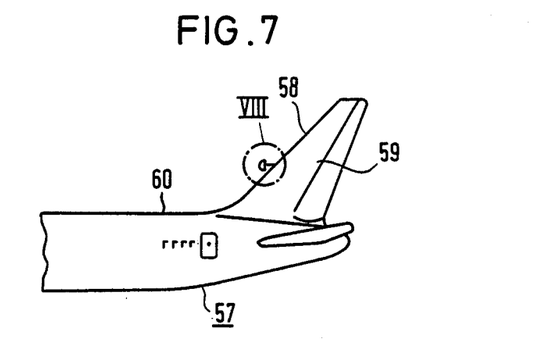
Figure 8:
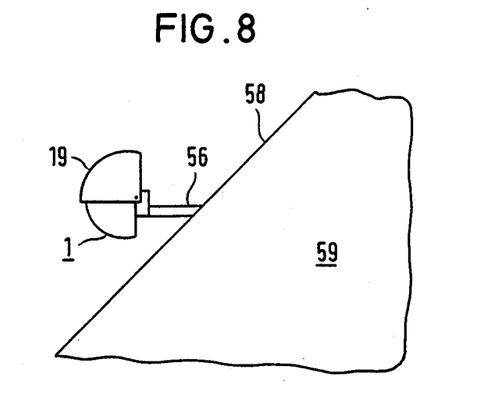

FIGS. 7 and 8 illustrate the mounting of the apparatus of the invention on an aircraft 57. The mounting device 56 projects in the flight direction from the front edge 58 of the rudder unit 59 and carries the measurement body 1 with the protective device 19.

The arrangement shown here of an apparatus in accordance with the invention at the rudder unit of an aircraft, above the fuselage boundary layer of the upper edge 60 of the fuselage of the aircraft 57, makes it possible to carry out disturbance-free measurement of the sideslip angle with minimum flow resistance losses due to the apparatus of the invention. This mounting of the apparatus on the rudder unit 59 substantially does not generate any additional flow resistance.

Figure 5:
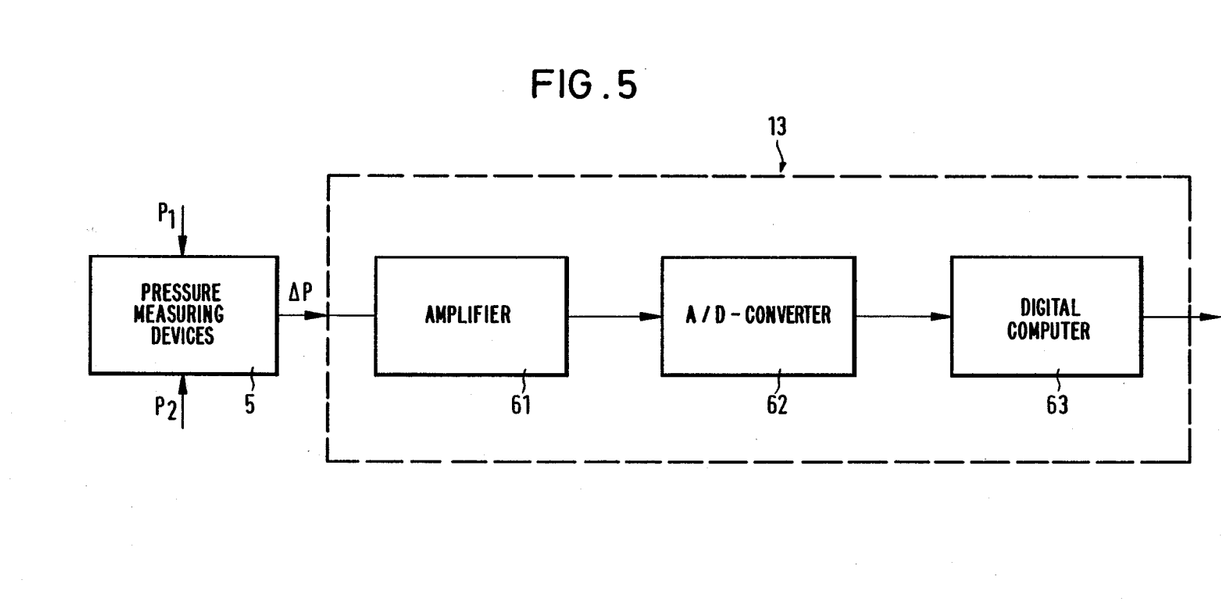

The comparison of the measured pressure distribution with the known pressure distribution takes place in an evaluation device 13 which preferably consists of a measurement signal amplifier 61, an analog-digital-converter 62 connected after the amplifier 61 and a subsequent digital computer 63. An arrangement of this kind is shown in FIG. 5.

First of all the signals delivered by the pressure measuring devices 5, preferably differential pressure signals, are amplified and converted into digital signals, the order of carrying out these two steps can also be reversed. During a differential pressure measurement the measurement range at the individual measurement locations is made smaller and any measurement errors which eventually occur are reduced hereby.

A measured pressure distribution curve over the locations of the pressure measurements on the surface 4 is produced from the digital signals which are passed to the digital computer 63. This measured pressure distribution curve results in a curve dependent on the arrangement of the pressure measuring devices 5. By way of example, for the semicircular arrangement of the pressure measuring devices, this curve is proportional to the equation:

$$y = \sin^2 \phi$$

with $\phi$ being the angle subtended at the centre of curvature 12 of the surface 4 between the location of the pressure measurement and the line of symmetry of the arrangement of the pressure measuring devices 5.

In the next step the branches of the curve of the measured pressure distribution curve, which must each lie between a minimum pressure value and the maximum pressure value, are linearised, which takes place by a coordinate transformation.

The size of the gradient of each of these two branches of the curve is determined in accordance with the method of the smallest quadratic error from the measured pressure values belonging to each branch of the curve and the two sizes are subsequently compared with one another.

If these two sizes are substantially dissimilar then the angle $\phi$ in the equation corresponding to the pressure distribution is respectively changed in a subsequent step by a predetermine angle $\Delta\phi$ until the sizes of the gradients of the linearised branches of the curve of the equation changed by $\Delta\phi$ are substantially the same. The change $\Delta\phi^*$ which leads to this equality then corresponds to the measured angle of the incident flow $\beta$.

The direction from which the flow is incident on the sphere can also be determined even without presetting a pressure distribution curve corresponding to a defined angle of the incident flow. For this purpose at least two identical mathematical approximations about any desired radius vector starting from the centre point of the sphere are each matched to half, or to a corresponding fraction of the total number of measured values, however to at least two of the measured values. The position of the radius vector which describes the line of symmetry with reference to a coordinate system, which can be previously freely selected, can be computed using the conditions that the two approximations must have the same value at the line of symmetry of the measured pressure distribution, and that the maximum of the pressure distribution, and thus of the approximations, occurs at this point. A Taylor series can be used with advantage for the mathematical approximation.

A signal proportional to the angle of incident flow makes it possible to correct the direction of travel in a particularly advantageous manner, for example by influencing the steering of the vehicle. For example, with aircraft, the direction of flight and also the engine power can be changed in order to automatically maintain the planned data (direction of flight, flight altitude, angle of attack, the sideslip angle or speed). Moreover, the signal can be used to show the angle of the incident flow via an indicating instrument so that the pilot can effect a corresponding course correction.

I claim:

1. A method of determining the angle of an incident flow and/or the airspeed at a point of measurement, comprising the steps of:
   (a) measuring the pressure of the incident flow of a fluid flowing at a spherically curved surface of a centrally symmetrical measurement body located at the point of measurement, the measuring step being performed on both sides of a line of symmetry which extends across the spherically shaped surface of the measurement body,
   (b) determining the pressure distribution curve over the spherically curved surface associated with the prevailing angle of incidence of the flow from said pressure values;
   (c) determining the angle of incidence of the flow by finding the angle of displacement of the determined pressure distribution curve and/or determining the airspeed from the maximum pressure value of the incident flow in the form of the sum of the static pressure and of the dynamic pressure, while a value corresponding to the static pressure and available as a reference value is subtracted from said maximum value;
   (d) transforming the determined pressure distribution curve into linearized sections on both sides of the maximum value in a processing device by coordinate transformation with each section extending between a minimum and the maximum of the pressure distribution curve;
   (e) determining the size of the gradient of each section from the linearized section;
   (f) if the sizes are unequal, displacing the determined pressure distribution curve by a predetermined correction angle (dp) on the surface;
   (g) repeating the steps (d) to (f) as often as necessary until the sizes are the same; and
   (h) determining the total correction angle ($\Delta p^*$) which leads via the steps to equality of the sizes and which corresponds to the angle of incidence ($\beta$).

2. A method of determining the angle of an incident flow and/or the airspeed at a point of measurement, a comprising the steps of:
   (a) measuring the pressure of the incident flow of a fluid flowing at a spherically shaped surface of a centrally symmetrical measurement body located at the point of measurement, the measuring step being performed on both sides of a line symmetry which extends across the spherically shaped surface of the measurement body,
   (b) determining the pressure distribution curve over the spherically curved surface associated with the prevailing angle of incidence of the flow from said pressure values;
   (c) determining the angle of incidence of the flow by finding the angle of displacement of the determined pressure distribution curve and/or determining the airspeed from the maximum pressure value of the incident flow in the form of the sum of the static pressure and of the dynamic pressure, while a value corresponding to the static pressure and available as a reference value is subtracted from said maximum value;
   (d) without presetting a pressure distribution curve associated with a defined angle of incidence about a desired radius vector starting from the centre point of the sphere, at least two identical mathematical approximations are matched to half, or to the corresponding fraction, of the total number, however to at least two of the measured value; and (e) on the conditions that said approximations must have the same value at the line of symmetry of the pressure distribution, and that at this position the maximum of the pressure distribution and thus of the approximation is to be found, the position of the radius vector which defines the line of symmetry is calculated relative to a coordinate system which can be freely preselected, with a Taylor series being preferably used for the mathematical approximation.

3. An apparatus for determining an angle of an incident flow comprised of:

a centrally symmetrical measurement body (1) with a shape of a sphere or of a spherical segment (3) arranged on the vehicle;

a plurality of devices (5) arranged in groups (10, 11) comprised of piezo-resistive pressure pick-ups (25) for measuring the pressure of the incident flow of a fluid flowing around the vehicle are provided in at least two locations at the surface of the measurement body (1) on each side of a line of symmetry (9) a first group (10) of pressure measuring devices (5) disposed in the range of angles from 0° to 15° to the line of symmetry (9), and a second group (11) of pressure measuring devices (5) disposed in the range of angles greater than 30° to the line of symmetry (9), said angles being measured relative to the centre of curvature (12) of the sphere or spherical segment (3); and an evaluation device (13) connected to the pressure measuring devices (5) for determining an actual pressure distribution curve from signals delivered by the pressure measuring devices (5) and for finding the angle of displacement between the actual pressure distribution curve and any desired selected coordinate system or for finding a pressure distribution curve previously determined using the same process or for finding a desired pressure distribution curve.

4. An apparatus for determining an angle of an incident flow on a vehicle comprised of:

a centrally symmetrical measurement body (1) with a shape of a sphere or of a spherical segment (3) arranged on the vehicle;

a plurality of devices (5) for measuring the pressure of the incident flow of a fluid flowing around the vehicle are provided in at least two locations at the surface of the measurement body (1) on both sides of a line of symmetry (9) of the sphere or of the spherical segment (3);

an evaluation device (13) connected to the pressure measuring devices (5) for determining an actual pressure distribution curve from signals delivered by the pressure measuring devices (5) and for finding the angle of displacement between the actual pressure distribution curve and any desired selected coordinate system or for finding a pressure distribution curve previously determined using the same process or for finding a desired pressure distribution curve; and a movable protective device (19) matched to the contour of the sphere or of the spherical segment (3), with the protective device being movable from a retracted position (19') in which it does not cover the surface (4) into a deployed position (19") in which it covers at least a portion of the surface (4) having the pressure measuring devices (5).

5. An apparatus for determining an angle of a incident flow on a vehicle comprised of:

a centrally symmetrical measurement body (1) with a shape of a sphere or of a spherical segment (3) arranged on the vehicle;

a plurality of devices (5) comprised of piezo-resistive pressure pick-ups (25) for measuring the pressure of the incident flow of a fluid flowing around the vehicle are provided in at least two locations at the surface of the measurement body (1) on both sides of a line of symmetry (9) of the sphere or of the spherical segment (3);

an evaluation device (13) connected to the pressure measuring devices (5) for determining an actual pressure distribution curve from signals delivered by the pressure measuring devices (5) and for finding the angle of displacement between the actual pressure distribution curve and any desired selected coordinate system or for finding a pressure distribution curve previously determined using the same process or for finding a desired pressure distribution curve; and at least one device (27) for temperature determination is provided in the region of the pressure measuring devices (5) and is connected with the evaluation device (13) in order to be able to compensate for temperature dependent measurement errors of the pressure measuring devices.

6. A method of determining the angle of an incident flow in at least one measurement plane at a measurement point, comprising the steps of:

using a measurement body at the measurement point to generate a pressure distribution of the incident flow as it flows around the measurement body, the measurement body having an at least partly spherical surface with a center of curvature and a datum line extending from said center of curvature to said spherical surface, said incident flow generating a symmetrical pressure distribution on said surface about a line of symmetry specific to the direction of said incident flow;

measuring the pressure of the incident flow around the measurement body at a plurality of locations on each side of said line of symmetry, with each of said plurality of locations on both sides of said line of symmetry lying in a common plane, thereby obtaining at least four distinct pressure measurement;

inputting said pressure measurements to a computing circuit; and determining said angle of incidence from said pressure measurements and form said respective angular positions of said locations.

7. A method in accordance with claim 6, wherein said measuring of pressure is accomplished with pressure transducers of each of said locations flush with said spherical surface.

8. A method of determining the angle of incidence in accordance with claim 6 and comprising the following steps:

(a) transforming the determined pressure distribution in the form of a curve into linearized sections on both sides of the maximum value in the computing device by coordinate transformation with each section extending between a minimum and the maximum of the pressure distribution curve;

(b) determining the size of the gradient of each section from the linearized sections;
(c) if the sizes are unequal, displacing the determined pressure distribution curve by a predetermined correction angle ($\Delta \rho$) on the surface;
(d) repeating the steps (a) to (c) as often as necessary until the sizes are the same; and
(e) determining the total correction angle ($\Delta \rho^*$) which leads to equality of the sizes and which corresponds to the angle of incidence ($\beta$).

9. A method in accordance with claim 6,
wherein without presetting a pressure distribution curve associated with a defined angle of incidence about a desired radius vector starting from said center of curvature, at least two identical mathematical approximations are matched to half, or to the corresponding fraction, of the total number of measured values, however to at least two of the measured values; and
on the conditions that the said approximations must have the same value at the line o symmetry of the pressure distribution, and that at this position the maximum of the pressure distribution and thus of the approximation is to be found, the position of the radius vector which defines the line of symmetry of the pressure distribution is calculated relative to a coordinate system which can be freely preselected.

10. A method in accordance with claim 9, wherein a Taylor series is used for said mathematical approximation.

11. A method in accordance with claim 6, wherein the static pressure prevailing at said measurement body is additionally determined and wherein the speed of said incident flow is determined, by determining the maximum pressure value of the incident flow from said measured pressure values in the form of the sum of the static pressure and of the dynamic pressure, by subtracting said static pressure from said maximum pressure value and by calculating said flow speed from the result.

12. A method in accordance with claim 6 when said pressure values for the incident flow are determined in the form of differential pressure measurements each being the difference in pressure between the pressure of the incident flow at each location and a reference pressure which is the same for all locations.

13. A method of determining the angle of an incident flow in at least one measurement plane at a measurement point, comprising the steps of:
using a measurement body at the measurement point to generate a pressure distribution of the incident flow as it flows around the measurement body, the measurement body having an at least partly spherical surface with a center of curvature and a datum line extending from said center of curvature to said spherical surface, said incident flow generating a symmetrical pressure distribution on said surface about a line of symmetry specific to the direction of said incident flow,
measuring the pressure of the incident flow around the measurement body at a plurality of locations on each side of said line of symmetry, with each of said plurality of locations on each respective side of said line of symmetry subtending an angle at said center of curvature relative to said line of symmetry of a different magnitude from the other of said plurality of location;
calculating the pressure distribution produced at said spherical surface by said incident flow from said pressure values from said locations; and
determining said angle of incidence as the angle between a maximum of said pressure distribution and a direction of incidence corresponding to said datum line.

14. A method in accordance with claim 13, wherein respective pressure transducers are provided at each of said locations flush with said spherical surface.

15. Apparatus for determining the angle of an incident flow in at least one measurement plane at a measurement point, the apparatus comprising:
a measurement body positioned at said measurement point and having at least a part spherical surface with a center of curvature and a motional datum line extending from said center of curvation through said spherical surface, said incident flow generating a symmetrical pressure distribution on said surface about a line of symmetry specific to the direction of said incident flow;
at least two measurement locations on each side of said line of symmetry, with each of said at least two locations on both respective sides of said line of symmetry lying in a common plane;
respective pressure measuring devices for measuring the pressure at said surface at each of said locations; and
a computing circuit;
each of said pressure measuring devices being electrically connectable to said computing circuit, whereby said computing circuit computes said angle of said incident flow relative to said notional datum line from signals received from said pressure measuring devices and from the respective angular positions of said pressure measuring devices.

16. Apparatus in accordance with claim 15, wherein said computing circuit is adapted to compute an actual pressure distribution curve from said signals and to compute the angle of displacement between said actual pressure distribution curve and any desired coordinate system.

17. Apparatus in accordance with claim 15, wherein said computing circuit is adapted to compute an actual pressure distribution curve from said signals and to compute the angle of displacement between said actual pressure distribution curve and pressure distribution curve previously determined using the same process.

18. Apparatus in accordance with claim 15, wherein said computing circuit is adapted to compute one actual pressure distribution curve from said signals and to compute the angle of displacement between said actual pressure distribution curve and a desired pressure distribution curve.

19. Apparatus in accordance with claim 15, wherein the apparatus is mounted on aircraft.

20. Apparatus in accordance with claim 15, wherein said line of symmetry lies in said common plane.

21. Apparatus in accordance with claim 15, including means for measuring the static pressure at said measurement body and for inputting the measured value to said computing circuit, and wherein said computing circuit is additionally adapted to compute the speed of said incident flow from the maximum of said pressure distribution curve and said static pressure.

22. Apparatus in accordance with claim 15, wherein said pressure measuring devices lie flush with said spherical surface.

23. Apparatus in accordance with claim 15, including a closed chamber inside of the measurement body and is connected via a fluid communication with the environmental atmosphere; and wherein said closed chamber is connected to reference pressure pick-up sections of said pressure measuring devices said pressure meaning devices being constructed as differential pressure transducers.

24. Apparatus in accordance with claim 15, wherein said measurement body has a breakaway edge at a boundary of said partly spherical surface facing generally away from the direction of incident flow.

25. Apparatus in accordance with claim 15, wherein said pressure measuring devices are so arranged that for a predetermined spherical radius ideal measuring accuracy is obtained for a predetermined range of the speed of the incident flow and for a given number of the available pressure measuring devices.

26. Apparatus in accordance with claim 15, wherein said pressure measuring devices comprise of piezo-resistive pressure pick-ups.

27. Apparatus in accordance with claim 26, wherein said pressure measuring devices are arranged in groups.

28. Apparatus in accordance with claim 27, wherein there is provided on each side of said line of symmetry a first group of pressure measuring devices disposed in the range of angles from 0° to 15° to said datum line, and a second group of pressure measuring devices disposed in the range of angles greater than 30° to said datum line, said angles being measured relative to the centre of curvature of the sphere or spherical segment.

29. Apparatus in accordance with claim 26, wherein at least one device for temperature determination is provided in the region of said pressure measuring devices and is connected to said compensating circuit to compensate for temperature dependent measurement errors of said pressure measuring devices.

30. Apparatus in accordance with claim 15, wherein said measurement body is provided with a movable protective device matched to the contour of said partly spherical surfaces, with the protective device being movable from a retract ed position in which it exposes said partly spherical surface into a deployed position in which it covers at least a portion of said partly spherical surface having said pressure measurement devices.

* * * * *